March 17, 1970  G. T. DONOVAN  3,501,037
TRACTOR TIRE TRANSPORT HOLDER
Filed Aug. 29, 1968
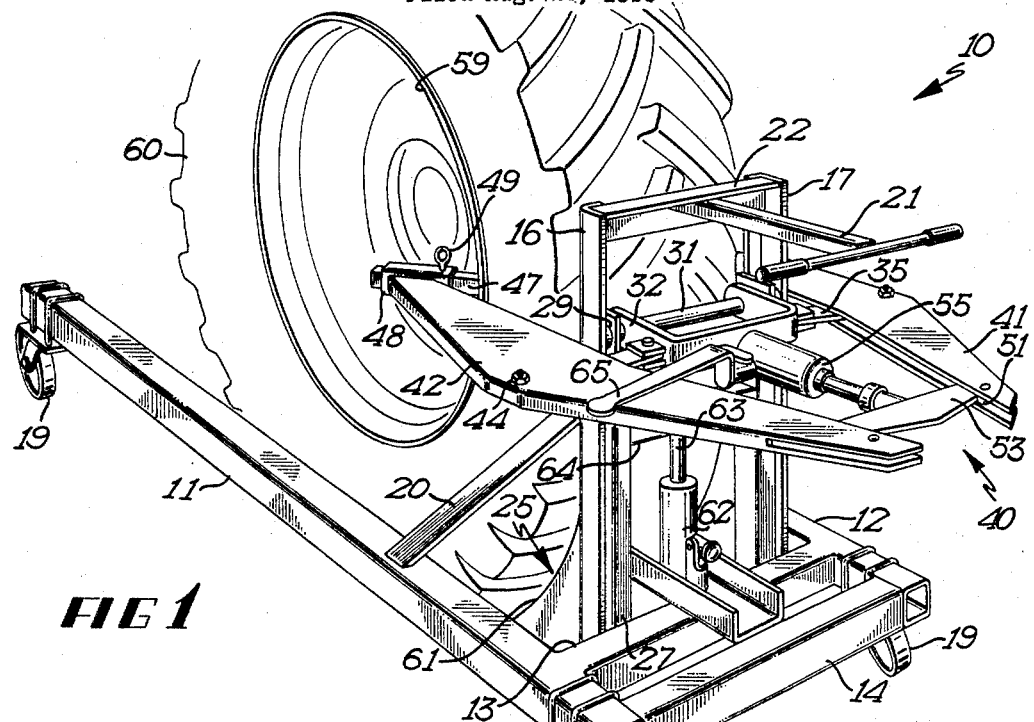
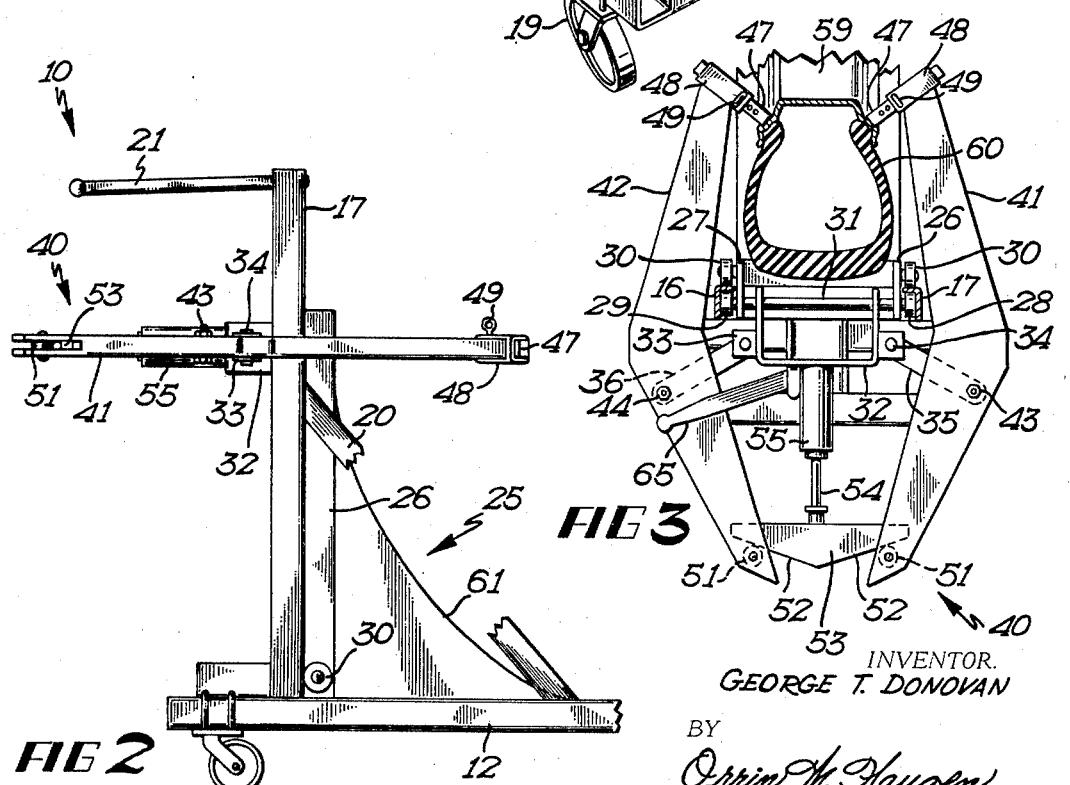
INVENTOR.
GEORGE T. DONOVAN
BY
Orrin M. Haugen
ATTORNEY

United States Patent Office 3,501,037
Patented Mar. 17, 1970

3,501,037
TRACTOR TIRE TRANSPORT HOLDER
George T. Donovan, Le Center, Minn., assignor to Le Center Implement Company, Le Center, Minn., a corporation of Minnesota
Filed Aug. 29, 1968, Ser. No. 756,096
Int. Cl. B60b 29/00; B75b 5/08
U.S. Cl. 214—331                                     7 Claims

ABSTRACT OF THE DISCLOSURE

A support rack for retaining and moving rimmed tractor tires which includes a support frame having secured thereto jaw means for engaging the inner diameter of a tractor tire to retain the tire in firmly engaged relationship therewith, means for urging said jaw means into clamping engagement with the tractor tire, and means for elevating the firmly clamped and engaged tractor tire from the ground surface. Pivotal mounting means are provided for the arms forming the jaw means to enable the rack means to be employed with a variety of sizes of tractor tires.

---

The present invention relates generally to an improved device for clamping tractor tires into locked engagement with a movable rack to enable safe movement of the tire from one location to another. In the servicing of heavy equipment, such as, for example, ordinary farm tractors, earth moving equipment, and the like, it freqeuntly becomes necessary to remove wheels from the vehicles to gain access to components of the apparatus. In addition, it frequently becomes necessary to remove these wheels for the purpose of servicing the tire which may be mounted on the rim of the vehicle. These tires are exceptionally large and heavy, and many vehicles utilize these tires with a liquid fill for the purpose of supplying ballast to the over-all system. It is not unusual for these large wheel and tire combinations to weigh in excess of 2 tons. Overhead derrick or lift mechanisms are not always entirely suitable for moving these tires from one location to another, and hence it is generally desirable to provide a movable rack means for holding or retaining the tire during movement thereof.

In the past, various devices have been proposed for handling tires of this sort, however these devices generally engage the tire along a direction parallel to the axis of the axle shaft. As a result, these devices have become awkward, cumbersome, and require a substantial space for storage. In accordance with the present invention, a highly compact unit is provided which engages the tire along an axis transverse to the axis of the axle shaft, and as a result a more compact and more maneuverable device is provided.

Briefly, this device includes a generally U-shaped base frame means having a pair of horizontal base arms arranged to straddle a tractor tire. At the rear or closed end of the frame, a support post is provided with a vertically movable carrier frame secured thereto. The carrier frame is provided with means for engaging the inner rim portion of the tractor tire and holding it in clamped engagement with the carrier frame. The carrier frame may then be raised relative to the support post to lift the tire from the ground surface, and permit movement of the tire to a remote location.

It is therefore an object of the present invention to provide an improved compact tractor tire retaining means which is adapted to clampingly engage a tractor tire and hold and maintain this clamped engagement while the tire supporting rack is moved from one location to another.

It is yet a further object of the present invention to provide an improved tractor tire support rack means which is adapted for use with a variety of sizes of tires, jaw means being provided to clampingly engage tractor tires having a variety of sizes and configurations.

Other and further objects of the present invention will become apparent to those skilled in the art upon a study of the following specification, appended claims, and accompanying drawing wherein:

FIGURE 1 is a perspective view of the support rack apparatus of the present invention, and showing a tractor tire held in clamped engagement with the apparatus;

FIGURE 2 is a side elevational view, partially broken away, of the apparatus illustrated in FIGURE 1, and showing the tractor tire removed therefrom; and FIGURE 3 is a horizontal sectional view taken along the line and in the direction of the arrows 3—3 of FIGURE 2, FIGURE 3 showing the apparatus with a tractor tire held in clamped engagement therewith.

In the preferred embodiment of the present invention, as particularly shown in FIGURE 1, the support rack means generally designated 10 includes a pair of horizontally arranged support frame members 11 and 12 secured together by the cross bars 13 and 14 thus forming a generally U-shaped rack. At the base of the frame, a pair of support posts 16 and 17 are shown, these posts being welded firmly to the frame member 13, particularly as shown in FIGURES 1 and 3. In order to provide for ease of movement of the support rack, a plurality of castors such as shown at 19—19 are provided. These castors may be coupled to the frame by means of U bolts or the like, as illustrated.

Since heavy loads are frequently contemplated in this system, the frame members 11, 12, 13 and 14 are preferably box frame devices, although other frame means may be satisfactorily employed, as may be determined by the requirements of the system. Angular support brackets such as are shown at 20 are also provided for adding rigidity to the system. For ease of transport, a handle such as is shown at 21 is provided, this handle being secured, as indicated, to the support posts 16 and 17 by way of the cross bar 22.

Coupled to the support posts 16 and 17 is a carrier frame assembly generally designated 25. This carrier frame assembly includes a pair of plates 26 and 27, and a pair of vertical columns 28 and 29. The columns 28 and 29 are adapted to be held in captive relationship with the angle support posts 16 and 17, as best shown in FIGURE 3, and a freely rotating idler wheel is provided as at 30—30 for balance of the system, when loaded. Along the plates 26 and 27, a support shaft 31 is provided for coupling or mounting the jaw assembly which will be described in detail hereinafter. The member 31 is adapted to move upwardly and downwardly with the carrier frame member, and as shown in FIGURE 3, includes a generally U-shaped frame member 32 coupled thereto. Ears 33—33 are provided for retaining pivot pins 34—34 which couple link arms 35 and 36 to the system.

Turning now to the jaw structure, the jaw generally designated 40 includes a pair of pivotally mounted arms 41 and 42, these arms being pivotally coupled to the link arms 35 and 36 by means of pivot pins 43 and 44. One end of the arms is provided with a tire engaging lug as at 47, the lug including a sleeve retainer 48 along with a removable locking pin 49. The pin 49 is utilized to lock the lug 47 against movement relative to the sleeve 48. At the opposite end of the arms 41 and 42, there is arranged a cam follower or idler such as at 51—51. The cam followers 51—51 are actuated by the cam surfaces 52—52 which are angularly disposed on the cam head 53. The cam head 53 is locked and coupled to the extensible piston rod member 54, which is operatively assolated with hydraulic cylinder 55. As is apparent from the drawing, as the cam head 53 moves toward the cam followers 51—51, the ends of the arms adjacent the cam followers will be spread, thus forcing or urging the tire engaging lugs into contact with the rim of the tractor tire 59 upon which tractor tire 60 is mounted.

As previously indicated, the carrier frame 25 is provided with an abutment plate for engaging the surface of the tire 60. This abutment plate is generally arcuately formed, and is shown at 61.

The carrier frame 25 is arranged to move vertically relative to the support posts 16 and 17. In this connection, hydraulic jack unit 62 is provided, this jack having an extensible rod 63 which is secured to the cross member 4. Both cylinders 55 and 62 are conventionally actuated, such as by the handle mechanism shown at 65.

In operation, the open end of the U-shaped base frame member is moved so as to straddle the tractor tire and the tire engaging lugs are then positioned so as to be in reasonably close contact with the rim portion 59, as shown in FIGURE 3. The handle 65 is then actuated or moved so as to extend the cam head 53 outwardly, thus pivotally spreading the arms 41 and 42 at their cam follower ends, and correspondingly causing a converging of the tire engaging lugs 47—47. When the tire is firmly in place, it is removed from the vehicle, and thereafter jack 62 is actuated to elevate the clamped tire from the ground surface to permit movement of the support rack to a remote location.

The feature of the link arms 35 and 36 permits versatility of operation of the device so as to permit its use with a variety of sizes of tires. Furthermore, the pivotal shaft 31 accommodates pivotal motion of the clamping mechanism, when this occurs.

It will be seen, therefore, that the support rack of the present invention is compact, rugged, and capable of handling a variety of sizes and configurations of large vehicle tires.

What is claimed is:
1. Support means for retaining and moving rimmed vehicle tires comprising:
 (a) a support frame having a generally vertical support post secured thereto and a carrier frame adapted for up and down movement relative to said support post;
 (b) jaw means for engaging the inner diameter of a vehicle tire and retaining said tire in firmly engaged relationship therewith, said jaw means including a pair of pivotally mounted mutually opposed arms, each arm having a tire engaging end, an actuating end, and a mounting point therebetween for pivotally mounting the arm to one end of a link arm pivotally secured to said carrier frame, said tire engaging end having a pair of tire engaging lugs mounted thereon, and said actuating end having a cam follower mounted thereon, the jaw means being adapted to clampingly engage the inner diameter of a large vehicle tire;
 (c) actuating means including cam means in contact with said cam follower and arranged to pivotally force said arms about said mounting point to cause convergence of said tire engaging ends;
 (d) abutment plate means adjacent said carrier frame and arranged in opposed disposition to the tire engaging end of said arms for contacting the outer circumference of a vehicle tire retained by said jaw means, and
 (e) means for controllably raising said carrier frame relative to said support posts.

2. The support rack as defined in claim 1 being particularly characterized in that said tire engaging lugs are disposed in slidable locking engagement in the tire engaging end of said arms.

3. The support rack as defined in claim 1 being particularly characterized in that said link arms are pivotally secured to said carrier frame and said carrier frame is adapted for pivotal motion about a horizontal axis.

4. The support rack as defined in claim 1 being particularly characterized in that said cam means comprises a cam head mounted on an extensible shaft.

5. The support rack as defined in claim 4 being particularly characterized in that said cam means comprises a cam head mounted on the extensible rod of a hydraulic cylinder.

6. The support rack as defined in claim 1 being particularly characterized in that said means for controllably raising said carrier frame is a hydraulic cylinder having a piston operatively associated therewith.

7. The support rack as defined in claim 1 being particularly characterized in that said support frame is a generally U-shaped support frame open at the end opposite to said jaw means, and wherein said support frame is supported by castor wheels.

References Cited
UNITED STATES PATENTS

| | | | |
|---|---|---|---|
| 2,877,913 | 3/1959 | Arnot | 214—332 |
| 3,049,253 | 8/1962 | Cabral | 214—332 X |

HUGO O. SCHULZ, Primary Examiner

U.S. Cl. X.R.

214—333; 294—115